C. A. JUENGST.
SPROCKET WHEEL.
APPLICATION FILED MAY 14, 1914.

1,128,789.

Patented Feb. 16, 1915

WITNESSES
Chas. F. Clagett
Bertha M. Allen

INVENTOR
Charles A. Juengst
BY
HIS ATTORNEYS

UNITED STATES PATENT OFFICE.

CHARLES A. JUENGST, OF CROTON FALLS, NEW YORK, ASSIGNOR TO HIGLEY MACHINE COMPANY, OF CROTON FALLS, NEW YORK, A CORPORATION OF NEW YORK.

SPROCKET-WHEEL.

1,128,789.  Specification of Letters Patent.  Patented Feb. 16, 1915.

Application filed May 14, 1914. Serial No. 838,435.

*To all whom it may concern:*

Be it known that I, CHARLES A. JUENGST, a citizen of the United States, residing at Croton Falls, in the county of Westchester and State of New York, have invented an Improvement in Sprocket-Wheels, of which the following is a specification.

My present invention relates to sprocket wheels generally, but more particularly to a sprocket wheel adapted to drive a cold metal saw, such as, for example, is disclosed in Letters Patent, No. 864,424, August 27, 1907, and No. 870,180, November 5, 1907.

The particular form of sprocket to which my invention relates is one in which the sprocket teeth are set at an inclination to the axis of rotation thereof, in order to provide for the construction of the saw driving mechanism as disclosed in the Letters Patent aforesaid.

The object of my present invention is the provision of a sprocket wheel having teeth of exceedingly hard metal, in order to gain all the advantages which may be derived therefrom and a hub of softer metal, in order that the same may be machined by any ordinary set of tools.

In carrying out my invention, I employ a sprocket skeleton comprising a ring, with teeth at predetermined positions in the periphery thereof made of manganese steel, and a hub of iron or other similar material cast about the said ring and a portion of said teeth, as will be hereinafter more particularly described.

Figure 1:
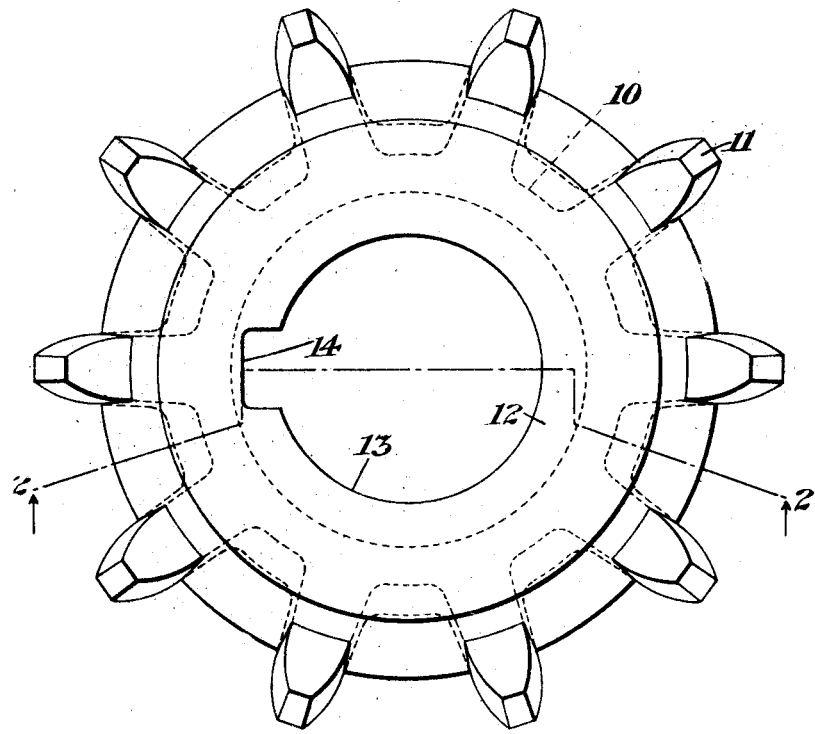
Figure 2:
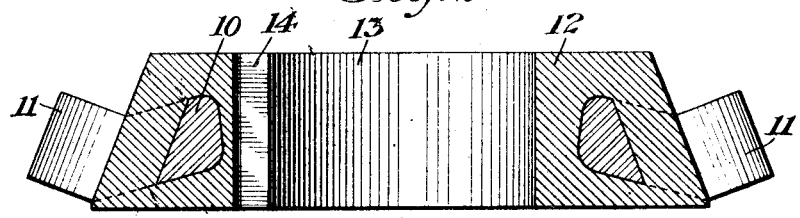

In the drawing, Figure 1 is an elevation of a sprocket wheel made in accordance with my present invention. Fig. 2 is a cross section taken on line 2, 2, Fig. 1.

Referring to the drawing, my improved sprocket wheel preferably comprises a ring indicated at 10, provided with suitably formed teeth 11. This member is preferably made of manganese steel and, as shown in the drawing, the teeth are formed at an angle with the rim. I prefer to call this member a sprocket skeleton, and after the same has been made in the construction of my improved sprocket wheel, a pattern of a full-sized wheel is employed, as is customary in making a mold. After the mold has been made, the sprocket skeleton is set therein as a core, and iron or other suitable metal, in a molten condition is poured into the mold and permitted to incase the ring and a portion of each tooth at the base thereof, so that when the sprocket is removed from the mold, the sprocket skeleton is provided with a hub 12, of cast iron or other suitable material, which is provided with a bore 13 for mounting the same upon a shaft, and a keyway 14 for securing the same, in position thereon, it being understood that by forming the hub of iron or other similar cast metal, the same may be readily machined, as desired, by tools ordinarily in use.

I claim as my invention:

1. As a new article of manufacture, a sprocket wheel comprising a base of relatively hard metal and sprocket teeth set at an angle to and integral therewith, and a hub of relatively soft metal cast about the said base to entirely inclose the same and the adjacent portions of the said sprocket teeth.

2. As a new article of manufacture, a sprocket wheel comprising a ring, sprocket teeth integral therewith, both said parts being made of manganese steel, and a hub having a beveled face and cast about the said ring, so as to entirely inclose the same and a portion of the teeth at the base there of with the projecting portions of the teeth extending at right angles from the beveled face of the hub.

Signed by me this 28th day of April, 1914.

CHAS. A. JUENGST.

Witnesses:
BERTHA M. ALLEN,
J. B. LE BLANC.